(12) United States Patent
Maeda et al.

(10) Patent No.: US 9,905,823 B2
(45) Date of Patent: Feb. 27, 2018

(54) BATTERY PACK

(71) Applicant: KABUSHIKI KAISHA TOYOTA JIDOSHOKKI, Aichi-ken (JP)

(72) Inventors: Kazuki Maeda, Kariya (JP); Takayuki Kato, Kariya (JP); Hiromi Ueda, Kariya (JP); Naoto Morisaku, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 0 days.

(21) Appl. No.: 15/301,173

(22) PCT Filed: Feb. 27, 2015

(86) PCT No.: PCT/JP2015/055752
§ 371 (c)(1),
(2) Date: Sep. 30, 2016

(87) PCT Pub. No.: WO2015/156053
PCT Pub. Date: Oct. 15, 2015

(65) Prior Publication Data
US 2017/0025656 A1    Jan. 26, 2017

(30) Foreign Application Priority Data
Apr. 11, 2014   (JP) .................. 2014-082170

(51) Int. Cl.
*H01M 2/10* (2006.01)
*H01M 10/42* (2006.01)

(52) U.S. Cl.
CPC ....... *H01M 2/1077* (2013.01); *H01M 10/425* (2013.01); *H01M 2010/4271* (2013.01); *H01M 2220/20* (2013.01)

(58) Field of Classification Search
None
See application file for complete search history.

(56) References Cited

U.S. PATENT DOCUMENTS

2011/0117401 A1    5/2011  Lee
2012/0040237 A1*   2/2012  Hamada ............. H01M 2/1077
                                                        429/159
(Continued)

FOREIGN PATENT DOCUMENTS

JP    2003-346754    12/2003
JP    2008-269895    11/2008
(Continued)

OTHER PUBLICATIONS

International Search Report, along with English-language translation thereof, for PCT/JP2015/055752 dated Apr. 28, 2015.
(Continued)

*Primary Examiner* — Rena D Cronin
(74) *Attorney, Agent, or Firm* — Greenblum & Bernstein, P.L.C.

(57) ABSTRACT

A second battery module is stacked on a first battery module. A control device is mounted on a mounting plate of the first battery module. The control device is arranged between the first battery module and the second battery module. A control device of the first battery module is arranged between inner surfaces of first bolt insertion portions and inner surfaces of second bolt insertion portions of second battery holders.

5 Claims, 3 Drawing Sheets

(56) References Cited

U.S. PATENT DOCUMENTS

| | | | |
|---|---|---|---|
| 2012/0171550 A1* | 7/2012 | Inagaki | C01G 23/005 |
| | | | 429/158 |
| 2013/0136970 A1 | 5/2013 | Kurokawa et al. | |
| 2013/0330579 A1* | 12/2013 | Ejiri | H01M 2/1061 |
| | | | 429/53 |
| 2013/0330587 A1 | 12/2013 | Takahashi et al. | |

FOREIGN PATENT DOCUMENTS

| | | |
|---|---|---|
| JP | 2010-176999 | 8/2010 |
| JP | 2011-108653 | 6/2011 |
| JP | 2012/066875 | 5/2012 |
| JP | 2012-174507 | 9/2012 |
| JP | 2013-51085 | 3/2013 |
| JP | 2013-114953 | 6/2013 |
| JP | 2013-179094 | 9/2013 |
| JP | 2014-154504 | 8/2014 |
| WO | 2014/069182 | 5/2014 |

OTHER PUBLICATIONS

Written Opinion of the International Searching Authority, along with English-language translation thereof, for PCT/JP2015/055752 dated Apr. 28, 2015.
International Preliminary Report on Patentability for PCT/JP2015/055752 dated Oct. 12, 2016.
Official Action in DE Pat. Appl. No. 11 2015 001 776.3 dated Feb. 10, 2017.

* cited by examiner

BATTERY PACK

TECHNICAL FIELD

The present invention relates to a battery pack.

BACKGROUND ART

For example, Patent Document 1 discloses a battery pack that includes stacked battery boxes, which are battery modules each including a plurality of battery cells. A battery controller is arranged between stacked battery modules to control charging/discharging of the battery cells.

According to the above described configuration, a dead space exists between the stacked battery modules. If the dead space is increased, the dimension of the battery pack in the stacking direction of the battery modules is increased, accordingly. A greater size of the battery pack unfavorably increases the area occupied by the battery pack when mounted in a vehicle.

PRIOR ART DOCUMENTS

Patent Documents

Patent Document 1: Japanese Laid-Open Patent Publication No. 2010-176999

SUMMARY OF THE INVENTION

Problems that the Invention is to Solve

Accordingly, it is an objective of the present invention to provide a battery pack that has a reduced dimension in the stacking direction of battery modules.

Means for Solving the Problems

To achieve foregoing objective and in accordance with a first aspect of the present invention, a battery pack is provided that includes a first battery module and a second battery module. The first battery module includes a plurality of first battery holders and a plurality of first battery cells, which are each held by one of the first battery holders and aligned. The second battery module includes a plurality of second battery holders and a plurality of second battery cells, which are each held by one of the second battery holders and aligned. Two rows of bolt insertion portions project from the second battery holders toward the first battery module. The second battery module is stacked on the first battery module via the two rows of the bolt insertion portions. The second battery cells are bound in an alignment direction with bolts inserted in the two rows of the bolt insertion portions. A battery control unit is provided between the first battery module and the second battery module. The battery control unit is arranged between the two rows of the bolt insertion portions.

With this configuration, a dead space is formed between the two rows of the bolt insertion portions. Since the battery control unit is arranged in the dead space, the dimension of the battery pack in the stacking direction of the battery modules is restrained from increasing. Thus, compared to a case in which no battery control unit is arranged between two rows of bolt insertion portions, the dimension of the battery pack in the stacking direction of the battery modules is reduced.

MODES FOR CARRYING OUT THE INVENTION

A battery pack according to one embodiment of the present invention will now be described with reference to FIGS. 1 to 5.

Figure 1:
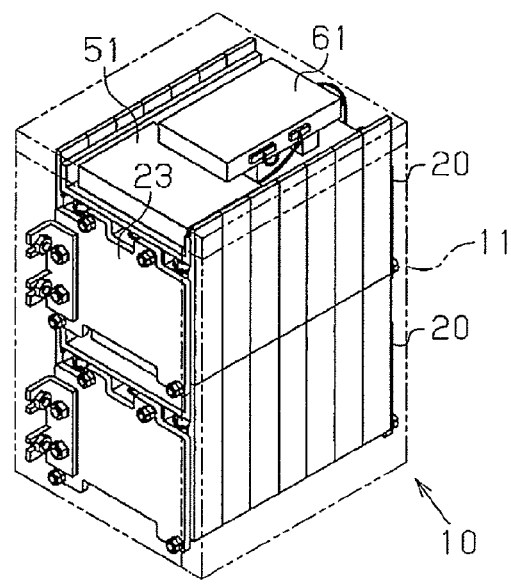
FIG. 1 is a perspective view illustrating a battery pack according to one embodiment of the present invention.

As shown in FIG. 1, a battery pack 10 is accommodated in a case 11. The case 11 accommodates battery modules 20. The battery modules 20 are stacked in the vertical direction and have the same structure.

Figure 2:
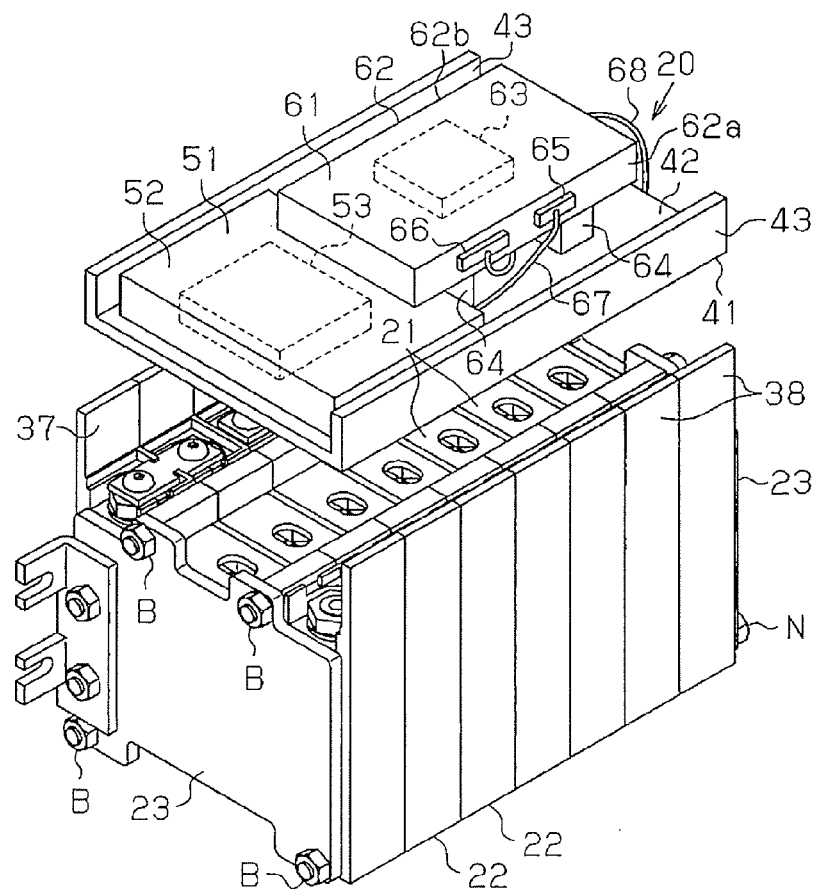
FIG. 2 is a perspective view showing a battery module of the battery pack.

As shown in FIG. 2, each battery module 20 includes battery cells 21 and plastic battery holders 22, which hold the battery cells 21. The battery cells 21 are held by the battery holders 22 and aligned. Each battery module 20 has an end plate 23 at either end in the alignment direction of the battery cells 21.

Figure 3:
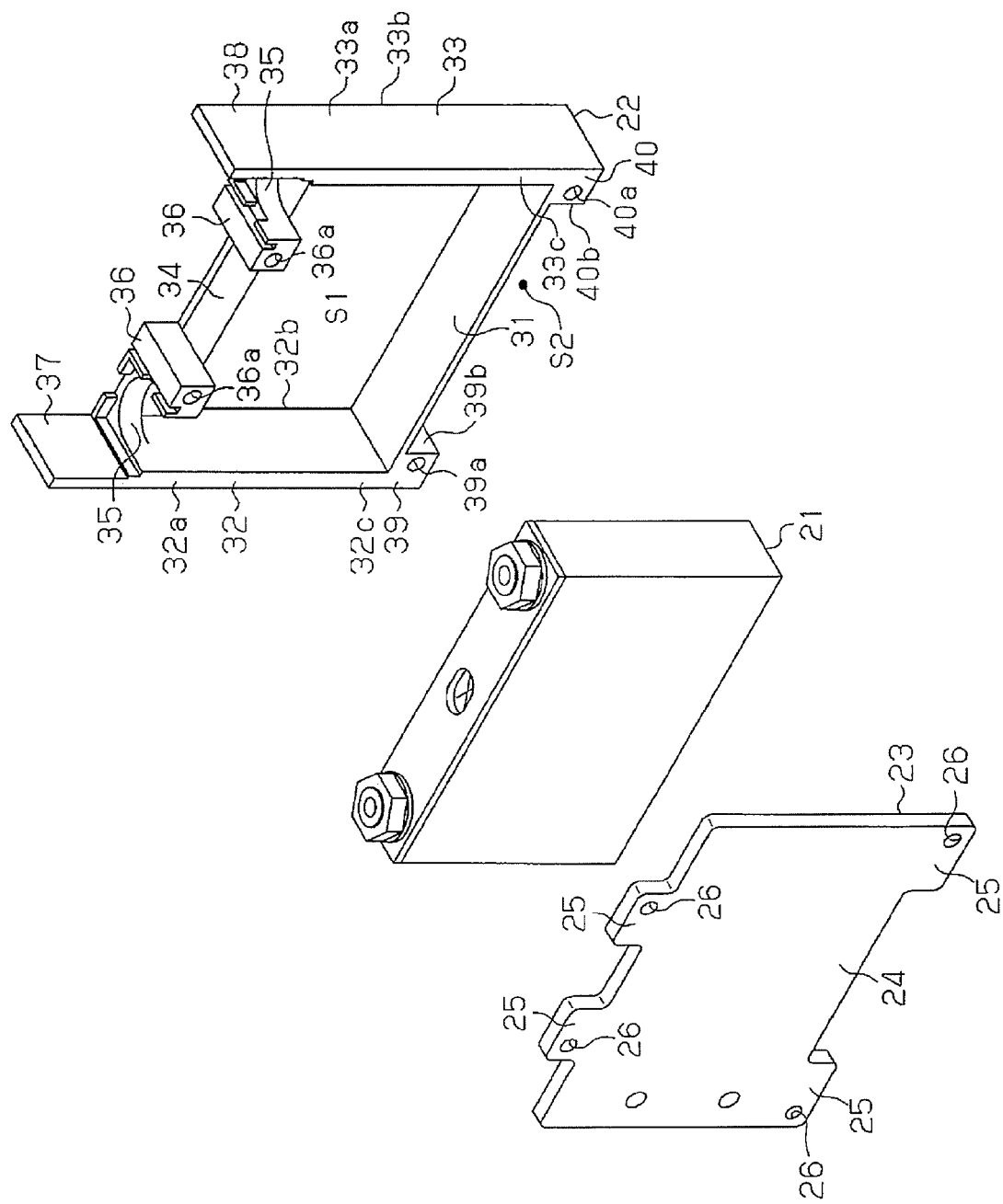
FIG. 3 is a perspective view illustrating a battery cell, a battery holder, and an end plate of a battery module.

As shown in FIG. 3, the end plate 23 includes a flat plate-shaped base portion 24 and four flat plate-shaped insertion portions 25, which protrude from the base portion 24. Each insertion portion 25 protrudes along the surface of the base portion 24. Each insertion portion 25 has an insertion hole 26. The insertion hole 26 extends through the insertion portion 25 along the thickness.

Each battery holder 22 has a first covering wall 31, which is shaped as a rectangular flat plate. The first covering wall 31 has, at the opposite ends in the longitudinal direction, rectangular plate-like second and third covering walls 32, 33. The second and third covering walls 32, 33 extend in the thickness direction of the first covering wall 31. A rectangular plate-like fourth covering wall 34 extends between a first end section 32a in the longitudinal direction of the second covering wall 32 and a first end section 33a in the longitudinal direction of the third covering wall 33. The first end section 32a of the second covering wall 32 is located on the opposite side from the first covering wall 31. The first end section 33a of the third covering wall 33 is also located on the opposite side from the first covering wall 31. The fourth covering wall 34 extends between first end sections 32b, 33b in the transverse direction of the covering walls 32, 33. The thickness direction of the fourth covering wall 34 agrees with the transverse direction of the covering walls 32, 33. The longitudinal direction of the fourth covering wall 34 agrees with the alignment direction of the second covering wall 32 and the third covering wall 33. The direction perpendicular to the thickness direction and the longitudinal direction of the fourth covering wall 34 is the transverse direction of the fourth covering wall 34.

The fourth covering wall 34 has terminal accommodating portions 35 at the opposite ends in the longitudinal direction. The terminal accommodating portions 35 open in the thickness direction of the fourth covering wall 34. Each terminal accommodating portion 35 is arranged on an end face in the transverse direction of the fourth covering wall 34. Each terminal accommodating portion 35 has a U shape. One of the terminal accommodating portions 35 is formed to be continuous with the second covering wall 32, while the other terminal accommodating portion 35 is formed to be continuous with the third covering wall 33.

A quadrangular prism-like insertion portion 36 is arranged on an end face in the transverse direction of the fourth covering wall 34. The insertion portion 36 are arranged to be adjacent to the terminal accommodating portions 35. The axes of the insertion portions 36 extend in the transverse direction of the covering walls 32, 33. Each insertion portion 36 has an insertion hole 36a, which extends through the insertion portion 36 in the axial direction.

The second covering wall 32 includes a rectangular flat plate-shaped first projecting wall 37 at the first end section 32a. The first projecting wall 37 extends in the longitudinal direction of the second covering wall 32. The third covering wall 33 includes a rectangular flat plate-shaped second projecting wall 38 at the first end section 33a. The second projecting wall 38 extends in the longitudinal direction of the third covering wall 33.

The second covering wall 32 has a quadrangular prism-like first bolt insertion portion 39 at a second end section 32c in the longitudinal direction. The axis of the first bolt insertion portion 39 extends in the transverse direction of the covering walls 32, 33. The first bolt insertion portion 39 has an insertion hole 39a, which extends through the first bolt insertion portion 39 in the axial direction.

The third covering wall 33 has a quadrangular prism-like second bolt insertion portion 40 at a second end section 33c in the longitudinal direction. The axis of the second bolt insertion portion 40 extends in the transverse direction of the covering walls 32, 33. The second bolt insertion portion 40 has an insertion hole 40a, which extends through the second bolt insertion portion 40 in the axial direction.

An inner surface 39b of the first bolt insertion portion 39 faces an inner surface 40b of the second bolt insertion portions 40 at a predetermined distance. Accordingly, a space S2 is defined between the first bolt insertion portion 39 and the second bolt insertion portion 40.

As shown in FIG. 2, multiple battery holders 22 are held between the end plates 23 and integrated using metal bolts B, which are inserted from one of the end plates 23 to the other end plate 23. Specifically, nuts N are threaded to the distal ends of the bolts B, which are passed through the latter end plate 23. The bolts B extend through the insertion holes 26 of the end plates 23 and the insertion holes 36a, 39a, 40a of the battery holders 22. Accordingly, the battery cells 21 are held between the battery holders 22 and bound in the alignment direction to be integrated.

The battery holders 22 support a mounting plate 41, which is arranged between the first projecting walls 37 and the second projecting walls 38. The mounting plate 41 has a rectangular flat plate-shaped base portion 42. A rectangular flat plate-shaped extension 43 is provided at either end in the transverse direction of the base portion 42. The extensions 43 extend from the side edges of the base portion 42 in the thickness direction of the base portion 42. The extensions 43 extend along the first and second projecting walls 37, 38. The longitudinal direction of the base portion 42 agrees with the alignment direction of the battery cells 21.

A relay device 51, which is a first electronic component, is placed on the base portion 42. The relay device 51 has a rectangular box-shaped relay case 52. The relay case 52 accommodates a relay 53, which switches between discharge and interruption of the battery cells 21. The relay case 52 also accommodates components that are not illustrated, such as a current sensor.

A control device 61, which is a second electronic component, is placed on the base portion 42. The control device 61 is located adjacent to the relay device 51. The relay device 51 and the control device 61 are aligned in the longitudinal direction of the base portion 42, that is, in the alignment direction of the battery cells 21. The control device 61 is stacked on the relay device 51 to partially overlap with the relay device 51. The direction in which the control device 61 is stacked on the relay device 51 is the same as the stacking direction of the battery modules 20. Pillar shaped support portions 64 are arranged at four positions on the lower surface of the control device 61. The control device 61 is placed on the mounting plate 41 with the support portions 64 in between. The control device 61 is located above the first projecting walls 37 and the second projecting walls 38. The control device 61 has a rectangular box-shaped control case 62. The control case 62 accommodates a battery ECU 63. The battery ECU 63 monitors the state of the battery cells 21 based on parameters such as the temperature of the battery cells 21 and controls the relay 53 and the like. In the present embodiment, the relay device 51 and the control device 61 constitute a battery control unit.

Figure 4:
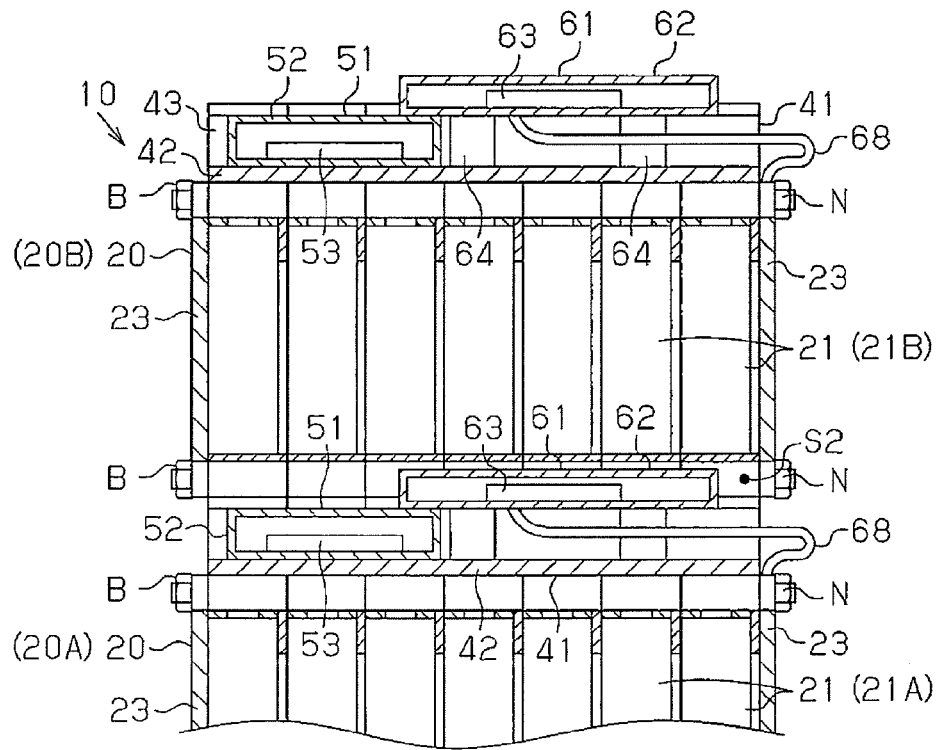
FIG. 4 is a cross-sectional view showing the battery pack.

As shown in FIGS. 2 and 4, connectors 65, 66 are attached to one of the side walls of the control case 62. A first harness 67, which is connected to the battery cells 21, is connected to the connector 65. A second harness 68, which is connected to the battery cells 21, is connected to the connector 66. The first harness 67 is connected to the battery cells 21 via the relay device 51. The second harness 68 is routed through between the control case 62 and the base portion 42 of the mounting plate 41 and between the end plate 23 and the mounting plate 41 and is connected to the battery cells 21. The side wall of the control case 62 to which the connectors 65, 66 are attached is defined as a first side wall 62a, and the side wall on the opposite side to the first side wall 62a is defined as a second side wall 62b of the control case 62. The dimension between the first side wall 62a and the second side wall 62b is less than the dimension between the first bolt insertion portion 39 and the second bolt insertion portion 40. The control device 61 is arranged such that the first side wall 62a of the control case 62 faces the second projecting wall 38 and the second side wall 62b faces the first projecting wall 37.

Figure 5:
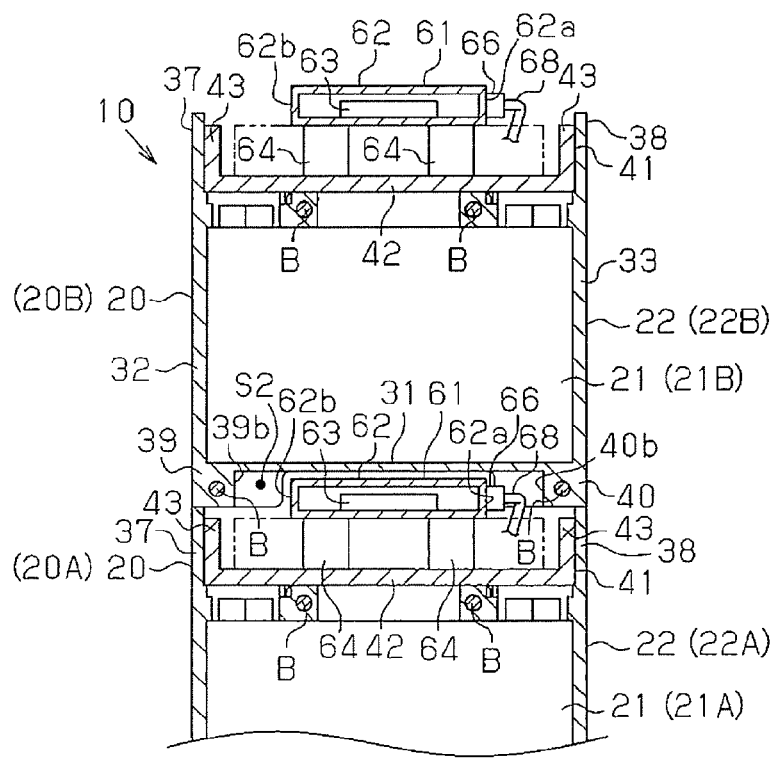
FIG. 5 is a cross-sectional view showing the battery pack.

As shown in FIGS. 4 and 5, the first bolt insertion portions 39 of the upper battery module 20 are placed on the first projecting walls 37 of the lower battery module 20. The second bolt insertion portions 40 of the upper battery module 20 are placed on the second projecting walls 38 of the lower battery module 20. Two rows of the bolt insertion portions 39, 40 of the battery holders 22 of the upper battery module 20 protrude toward the lower battery module 20.

Of the stacked battery modules 20, the lower battery module 20 is defined as a first battery module 20A. Also, the upper battery module 20 stacked on the first battery module 20A is defined as a second battery module 20B. Also, the battery holders 22 and the battery cells 21 of the first battery module 20A are defined as first battery holders 22A and first battery cells 21A, respectively. The battery holders 22 and the battery cells 21 of the second battery module 20B are defined as second battery holders 22B and second battery cells 21B.

The control device 61 that is placed on the mounting plate 41 of the first battery module 20A is arranged between the first battery module 20A and the second battery module 20B. The control device 61 of the first battery module 20A is arranged between the inner surfaces 39b of the first bolt insertion portions 39 and the inner surfaces 40b of the second bolt insertion portions 40 of the second battery holders 22B. Specifically, a part of the control case 62 of the control device 61 is arranged in the space S2, which is defined between the inner surfaces 39b of the first bolt insertion portions 39 and the inner surfaces 40b of the second bolt insertion portions 40. Parts of the first harness 67 and second harness 68, which extend from the control device 61, are arranged between the bolt insertion portions 39, 40. The control device 61 is separated from the bolt insertion portions 39, 40.

Operation of the above-described battery back 10 will now be described.

Each battery module 20 is constituted by integrating multiple battery cells 21 held by the battery holders 22 with the bolts B. In this configuration of the battery module 20, the bolts B must be inserted into the battery holders 22. However, the bolts B cannot penetrate the battery cells 21. Thus, in each battery holder 22, the bolt insertion portions 39, 40 must be arranged on the outer side of an accommodation portion S1 for accommodating the battery cell 21. Since the two rows of the bolt insertion portions 39, 40 projects in the stacking direction of the battery modules 20, the inner surfaces 39b of the first bolt insertion portions 39 and the inner surfaces 40b of the second bolt insertion portions 40 define the space S2 in between. Although the space S2 is a dead space, the space S2 can be utilized as an accommodation portion in which the control device 61 can be arranged.

The two rows of the bolt insertion portions 39, 40 receive the metal bolts B. Thus, when vibrations or impacts are applied to the bolt insertion portions 39, 40, the vibrations and impacts are unlikely to be transmitted to the control device 61. Also, the control device 61 is separated from and thus do not contact the bolt insertion portions 39, 40. This also prevents the control device 61 from receiving vibrations or impacts. The control device 61 is thus protected from vibrations and impacts.

When the relay device 51 and the control device 61 are placed on the mounting plate 41, part of the relay device 51 and the control device 61 may protrude from the mounting plate 41 in the alignment direction of the battery cells 21. In this case, if the relay device 51 and the control device 61 are stacked, the relay device 51 and the control device 61 are restrained from protruding from the mounting plate 41. In the present embodiment, the control device 61 is arranged between the two rows of the bolt insertion portions 39, 40. Thus, even if the relay device 51 and the control device 61 are stacked, the dimension of the battery module 20 in the stacking direction in the battery pack 10 is maintained small.

The above described embodiment has the following advantages.

(1) The control device 61 is placed on the mounting plate 41 of the first battery module 20A. The two rows of the bolt insertion portions 39, 40 receive the bolts B for integrating the battery cells 21 held by the battery holders 22. Since the control device 61 is arranged between the bolt insertion portions 39, 40, the control device 61 does not increase the dimension of the battery pack 10 in the stacking direction. Thus, compared to a case in which the control device 61 is not arranged between the two rows of the bolt insertion portions 39, 40, the dimension of the battery pack 10 in the stacking direction of the battery modules 20 is reduced.

(2) The control device 61 is separated from the bolt insertion portions 39, 40. Thus, compared to a case in which the control device 61 contacts the bolt insertion portions 39, 40, the control device 61 is less likely to receive vibrations or impacts. Therefore, the control device 61 is protected from vibrations and impacts.

(3) A part of the first harness 67 and a part of the second harness 68 are arranged between the two rows of the bolt insertion portions 39, 40. That is, the area between the two rows of the bolt insertion portions 39, 40 can be used as an area in which the first harness 67 and the second harness 68 are arranged.

(4) The control device 61 is stacked on the relay device 51. Thus, no parts of the relay device 51 or the control device 61 project from the mounting plate 41. This restrains the battery pack 10 from increasing in size in the alignment direction of the battery cells 21. Also, the control device 61 is arranged between the two rows of the bolt insertion portions 39, 40. Thus, even if the relay device 51 and the control device 61 are stacked, the dimension of the battery pack 10 in the stacking direction of the battery modules 20 is not increased.

(5) The bolts B are made of metal and have a greater thermal conductivity than that of the plastic the battery holders 22. Thus, the atmosphere about the control device 61 can be easily cooled by the bolts B, so that the control device 61 can be easily cooled.

The present embodiment may be modified as follows.

The number of the battery modules 20 may be greater than two. In this case also, one of two battery modules 20 adjacent to each other in the stacking direction is defined as a first battery module 20A, and the battery module 20 that is stacked on the first battery module 20A is defined as a second battery module 20B.

The control device 61 may contact the bolt insertion portions 39, 40.

The first harness 67 and the second harness 68 do not necessarily need to be arranged between the two rows of bolt insertion portions 39, 40.

The control device 61 and the relay device 51 do not necessarily need to be stacked. In this case, both of the relay device 51 and the control device 61 may be arranged between the two rows of the bolt insertion portions 39, 40.

The control device 61 may be entirely stacked on the relay device 51.

The relay device 51 may be stacked on the control device 61 and arranged between the two rows of the bolt insertion portions 39, 40. That is, the control device 61 may be a first electronic component, and the relay device 51 may be a second electronic component.

The battery control unit may be a device other than the control device 61 or the relay device 51. In short, the battery control unit may be any electronic component that contributes to charging and discharging of the battery cells 21.

The battery pack 10 does not necessary need to be accommodated in the case 11.

The first battery holders 22A of the first battery module 20A do not need to have bolt insertion portions 39, 40. That is, the first battery cells 21A of the first battery module 20A may be integrated with a means other than the bolts B. For example, the first battery cells 21A may be integrated by putting a metal band across the end plates 23.

It is sufficient if at least a part of the control device 61 is arranged between the two rows of the bolt insertion portions 39, 40. That is, the state in which the battery control unit is arranged between the two rows of the bolt insertion portions 39, 40 includes a case in which only a part of the battery control unit is arranged between the two rows of the bolt insertion portions 39, 40, instead of the entire battery control unit.

What is claimed is:

1. A battery pack comprising:
a first battery module, which includes a plurality of first battery holders and a plurality of first battery cells, which are each held by one of the first battery holders and aligned along an alignment direction of the battery pack;
a second battery module, which includes a plurality of second battery holders and a plurality of second battery cells, which are each held by one of the second battery holders and aligned along the alignment direction; and
a battery controller; wherein
the second battery holders each include two rows of bolt insertion portions that project from a bottom wall of the respective second battery holder toward the first battery module,
the second battery module is stacked on the first battery module via the two rows of the bolt insertion portions,
the second battery cells are bound in the alignment direction with bolts inserted in the two rows of the bolt insertion portions, wherein the bolts are inserted in the two rows of the bolt insertion portions in the alignment direction,
the battery controller is provided between the first battery module and the second battery module, and
the battery controller is arranged within a space bounded by the two rows of the bolt insertion portions and the bottom walls of the second battery holders.

2. The battery pack according to claim 1, wherein the battery controller is separated from the two rows of the bolt insertion portions.

3. The battery pack according to claim 1, further comprising:
a harness, which is connected to the first battery cells, wherein
the harness is arranged between the two rows of the bolt insertion portions.

4. The battery pack according to claim 1, wherein
the battery controller includes a first electronic component and a second electronic component,
at least part of the second electronic component is stacked on the first electronic component, and
the second electronic component is arranged between the two rows of the bolt insertion portions.

5. The battery pack according to claim 1, wherein
the first and second battery holders each include an interior that defines an accommodation portion,
the first battery cells are each held within the accommodation portion of one of the first battery holders, and
the second battery cells are each held within the accommodation portion of one of the second battery holders.

* * * * *